(12) United States Patent
Yamazaki (10) Patent No.: US 10,278,219 B2
(45) Date of Patent: Apr. 30, 2019

(54) USER TERMINAL AND COMMUNICATION CONTROL METHOD

(71) Applicant: KYOCERA CORPORATION, Kyoto (JP)

(72) Inventor: Chiharu Yamazaki, Tokyo (JP)

(73) Assignee: KYOCERA Corporation, Kyoto (JP)

(\*) Notice: Subject to any disclaimer, the term of this patent is extended or adjusted under 35 U.S.C. 154(b) by 0 days.

(21) Appl. No.: 15/119,089

(22) PCT Filed: Feb. 12, 2015

(86) PCT No.: PCT/JP2015/053812
§ 371 (c)(1),
(2) Date: Aug. 15, 2016

(87) PCT Pub. No.: WO2015/125686
PCT Pub. Date: Aug. 27, 2015

(65) Prior Publication Data
US 2017/0048902 A1 Feb. 16, 2017

(30) Foreign Application Priority Data

Feb. 18, 2014 (JP) ................................. 2014-028808

(51) Int. Cl.
*H04W 76/14* (2018.01)
*H04W 4/70* (2018.01)
(Continued)

(52) U.S. Cl.
CPC ............. *H04W 76/14* (2018.02); *H04W 4/70* (2018.02); *H04W 8/005* (2013.01); *H04W 48/16* (2013.01);
(Continued)

(58) Field of Classification Search
CPC ... H04W 76/023; H04W 4/005; H04W 8/005; H04W 48/16; H04W 72/00;
(Continued)

(56) References Cited

U.S. PATENT DOCUMENTS

2011/0216844 A1\* 9/2011 Higuchi ................ H04L 5/0048
375/260
2013/0109301 A1\* 5/2013 Hakola .................. H04W 76/14
455/39
(Continued)

FOREIGN PATENT DOCUMENTS

| WO | 2013/049959 A1 | 4/2013 |
| WO | 2014/018333 A2 | 1/2014 |
| WO | 2015/053382 A1 | 4/2015 |

OTHER PUBLICATIONS

International Search Report issued in PCT/JP2015/053812; dated May 19, 2015.
(Continued)

*Primary Examiner* — Mong-Thuy T Tran
(74) *Attorney, Agent, or Firm* — Studebaker & Brackett PC (57) ABSTRACT

An UE 100#1 performs D2D communication that is direct device-to-device communication in a frequency band #1. The UE 100#1 transmits a specific D2D signal that includes frequency band information indicating the frequency band #1. The UE 100#1 transmits the specific D2D signal in frequency bands #2 and #3 different from the frequency band #1.

11 Claims, 5 Drawing Sheets

(51) Int. Cl.
*H04W 8/00* (2009.01)
*H04W 72/00* (2009.01)
*H04W 48/16* (2009.01)
*H04W 72/12* (2009.01)
*H04W 92/18* (2009.01)
*H04W 72/04* (2009.01)
*H04W 84/04* (2009.01)
*H04W 88/16* (2009.01)

(52) U.S. Cl.
CPC ....... *H04W 72/00* (2013.01); *H04W 72/1215* (2013.01); *H04W 72/0453* (2013.01); *H04W 84/042* (2013.01); *H04W 88/16* (2013.01); *H04W 92/18* (2013.01)

(58) Field of Classification Search
CPC ......... H04W 72/1215; H04W 72/0453; H04W 84/042; H04W 88/16; H04W 92/18; H04W 76/14; H04W 4/70
USPC ...................................................... 455/452.1
See application file for complete search history.

(56) References Cited

U.S. PATENT DOCUMENTS

| | | | | |
|---|---|---|---|---|
| 2013/0178160 A1* | 7/2013 | Wang | .................... | H04W 48/10 455/41.2 |
| 2013/0272262 A1* | 10/2013 | Li | ................... | H04W 28/02 370/330 |
| 2013/0273851 A1* | 10/2013 | Preiszler | ............... | H04W 4/008 455/41.2 |
| 2014/0120934 A1* | 5/2014 | Kishiyama | ............ | H04W 76/14 455/452.1 |
| 2015/0023316 A1* | 1/2015 | Ko | ........................ | H04L 5/0032 370/330 |
| 2015/0139006 A1* | 5/2015 | Seo | ........................ | H04J 11/005 370/252 |
| 2015/0156619 A1* | 6/2015 | Fodor | .................... | H04W 8/005 455/434 |
| 2015/0341878 A1* | 11/2015 | Lee | ...................... | H04W 56/004 370/329 |
| 2015/0341971 A1* | 11/2015 | Fodor | ................. | H04W 76/023 370/280 |
| 2016/0037385 A1* | 2/2016 | Boudreau | ............. | H04W 28/18 370/328 |
| 2016/0044634 A1* | 2/2016 | Seo | ........................ | H04W 76/14 370/312 |
| 2016/0094327 A1* | 3/2016 | Han | ...................... | H04L 1/0073 370/329 |
| 2016/0149660 A1* | 5/2016 | Seo | ........................ | H04W 76/14 370/336 |
| 2016/0205534 A1 | 7/2016 | Fujishiro et al. | | |

OTHER PUBLICATIONS

Written Opinion issued in PCT/JP2015/053812; dated May 19, 2015.

3rd Generation Partnership Project; Technical Specification Group RAN; Study on LTE Device to Device Proximity Services-Radio Aspects; 3GPP TR 36.843; V1.0.0; Nov. 2013; pp. 1-32; Release 12; 3GPP Organizational Partners.

The extended European search report issued by the European Patent Office dated Aug. 22, 2017, which corresponds to EP15752883.7-1853 and is related to U.S. Appl. No. 15/119,089.

Intel Corporation, "Resource allocation for D2D communication," R2-140312, 3GPP TSG RAN WG2 Meeting #85, Feb. 10, 2014 to Feb. 14, 2014, Prague, Czech Republic.

* cited by examiner

FIG. 7

US 10,278,219 B2

USER TERMINAL AND COMMUNICATION CONTROL METHOD

TECHNICAL FIELD

The present invention relates to a user terminal used in a mobile communication system and a communication control method.

BACKGROUND ART

In 3GPP (3rd Generation Partnership Project) which is a project aiming to standardize a mobile communication system, the introduction of a Device to Device (D2D) proximity service is discussed as a new function in Release 12 and later (see Non Patent Document 1).

The D2D proximity service (D2D ProSe) is a service enabling direct device-to-device communication within a synchronization cluster formed by a plurality of synchronized user terminals. The D2D proximity service includes: a D2D discovery procedure (Discovery) in which a proximal terminal is discovered; and D2D communication (Communication) that is direct device-to-device communication.

PRIOR ART DOCUMENT

Non-Patent Document

Non Patent Document 1: 3GPP technical report "TR 36.843 V1.0.0" Jan. 16, 2014

SUMMARY OF THE INVENTION

Here, a case is assumed where one user terminal and the other user terminal belong to different PLMNs (Public Land Mobile Networks).

In such a case, the frequency band used by the one user terminal for the D2D discovery procedure/D2D communication dose not match the frequency band used by the other user terminal for the D2D discovery procedure/D2D communication. Therefore, there is a problem in that the D2D communication may not be started between the user terminals belonging to the different PLMNs.

Therefore, an object of the present invention is to enable a start of D2D communication between user terminals belonging to different PLMNs.

A user terminal according to a first aspect performs D2D communication that is direct device-to-device communication in a predetermined frequency band. The user terminal comprises: a transmitter configured to transmit a specific D2D signal that includes frequency band information indicating the predetermined frequency band. The transmitter transmits the specific D2D signal in a frequency band different from the predetermined frequency band.

A user terminal according to a second aspect supports D2D communication that is direct device-to-device communication. The user terminal comprises: a receiver configured to receive a specific D2D signal from another user terminal configured to use a predetermined frequency band for the D2D communication, and a controller configured to perform control to start the D2D communication with the another user terminal on a basis of the specific D2D signal. The specific D2D signal includes frequency band information indicating the predetermined frequency band. The receiver receives the specific D2D signal in a frequency band different from the predetermined frequency band.

A communication control method according to a third aspect comprises: a step A of transmitting, by a first user terminal configured to perform D2D communication that is direct device-to-device communication in a predetermined frequency band, a specific D2D signal including frequency band information indicating the predetermined frequency band; a step B of receiving, by a second user terminal, the specific D2D signal from the first user terminal; and a step C of performing, by the second user terminal, control to start the D2D communication with the first user terminal on the basis of the specific D2D signal. In the step A, the first user terminal transmits the specific D2D signal in a frequency band different from the predetermined frequency band. In the step B, the second user terminal receives the specific D2D signal in a frequency band different from the predetermined frequency band.

DESCRIPTION OF THE EMBODIMENT

[Overview of Embodiment]

A user terminal according to an embodiment performs D2D communication that is direct device-to-device communication in a predetermined frequency band. The user terminal comprises: a transmitter configured to transmit a specific D2D signal that includes frequency band information indicating the predetermined frequency band. The transmitter transmits the specific D2D signal in a frequency band different from the predetermined frequency band.

In the embodiment, the specific D2D signal is a D2D discovery signal transmitted in a D2D discovery procedure for discovering a proximity terminal.

In the embodiment, the specific D2D signal is a D2D synchronization signal transmitted in a D2D synchronization procedure for establishing device-to-device synchronization.

In the embodiment, the predetermined frequency band is a first frequency band allocated to a first PLMN. The transmitter transmits the specific D2D signal in a second frequency band allocated to a second PLMN.

In the embodiment, the frequency band information includes information indicating a center frequency of the predetermined frequency band, and information indicating a bandwidth of the predetermined frequency band.

In the embodiment, the specific D2D signal further includes time information related to a time resource used for the D2D communication.

A user terminal according to an embodiment supports D2D communication that is direct device-to-device communication. The user terminal comprises: a receiver configured to receive a specific D2D signal from another user terminal configured to use a predetermined frequency band for the D2D communication, and a controller configured to perform control to start the D2D communication with the another user terminal on a basis of the specific D2D signal. The specific D2D signal includes frequency band information indicating the predetermined frequency band. The receiver receives the specific D2D signal in a frequency band different from the predetermined frequency band.

In the embodiment, the specific D2D signal is a D2D discovery signal transmitted in a D2D discovery procedure for discovering a proximity terminal.

In the embodiment, the specific D2D signal is a D2D synchronization signal transmitted in a D2D synchronization procedure for establishing device-to-device synchronization.

In the embodiment, the predetermined frequency band is a first frequency band allocated to a first PLMN. The receiver receives the specific D2D signal in a second frequency band allocated to a second PLMN.

In the embodiment, the frequency band information includes information indicating a center frequency of the predetermined frequency band, and information indicating a bandwidth of the predetermined frequency band.

In the embodiment, the specific D2D signal further includes time information related to a time resource used for the D2D communication, and/or frequency information related to a frequency resource used for the D2D communication.

A communication control method according to an embodiment comprises: a step A of transmitting, by a first user terminal configured to perform D2D communication that is direct device-to-device communication in a predetermined frequency band, a specific D2D signal including frequency band information indicating the predetermined frequency band; a step B of receiving, by a second user terminal, the specific D2D signal from the first user terminal; and a step C of performing, by the second user terminal, control to start the D2D communication with the first user terminal on the basis of the specific D2D signal. In the step A, the first user terminal transmits the specific D2D signal in a frequency band different from the predetermined frequency band. In the step B, the second user terminal receives the specific D2D signal in a frequency band different from the predetermined frequency band.

[Embodiment]

Hereinafter, a description will be provided for an embodiment when the present invention is applied to an LTE system.

(System Configuration)

Figure 1:
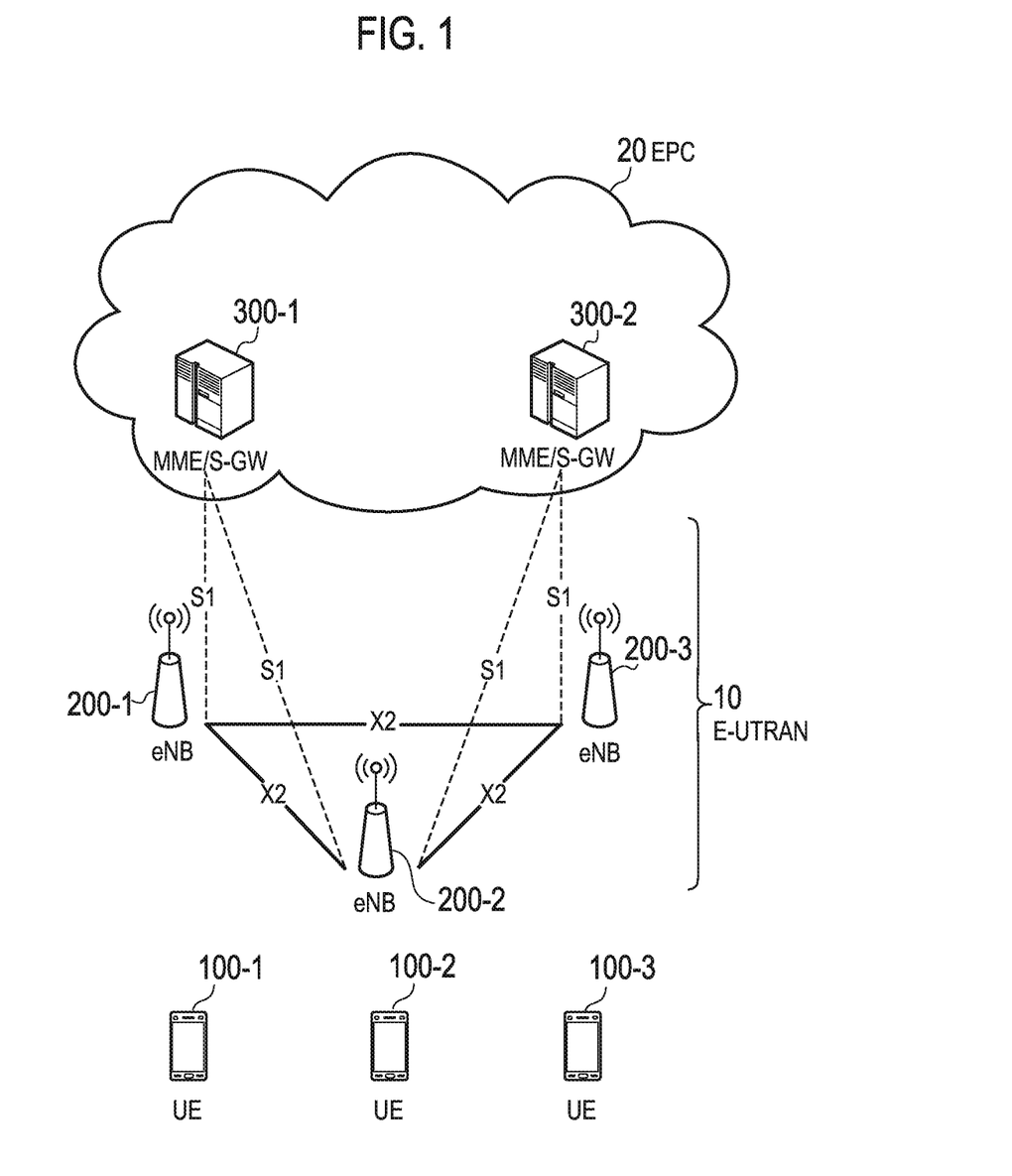
FIG. 1 is a configuration diagram of an LTE system according to an embodiment.

FIG. 1 is a configuration diagram of the LTE system according to the embodiment. As illustrated in FIG. 1, the LTE system according to the embodiment includes a plurality of UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile communication device and performs radio communication with a connected cell (a serving cell). A configuration of the UE 100 will be described later.

The E-UTRAN 10 corresponds to a radio access network. The E-UTRAN 10 includes eNBs 200 (evolved Node-Bs). The eNB 200 corresponds to a base station. The eNB 200 corresponds to the base station. The eNBs 200 are connected mutually via an X2 interface. A configuration of the eNB 200 will be described later.

The eNB 200 manages a cell or a plurality of cells and performs radio communication with UE 100 established a connection with the own cell. The eNB 200, for example, has a radio resource management (RRM) function, a routing function of user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. The E-UTRAN 10 and the EPC 20 constitute a network of the LTE system (LTE network). The EPC 20 includes MMEs (Mobility Management Entities)/S-GWs (Serving-Gateways) 300. The MME is a network node for performing various mobility controls, for example, for the UE 100. The S-GW performs transfer control of user data. The MME/S-GW 300 is connected to the eNBs 200 via an S1 interface.

Figure 2:
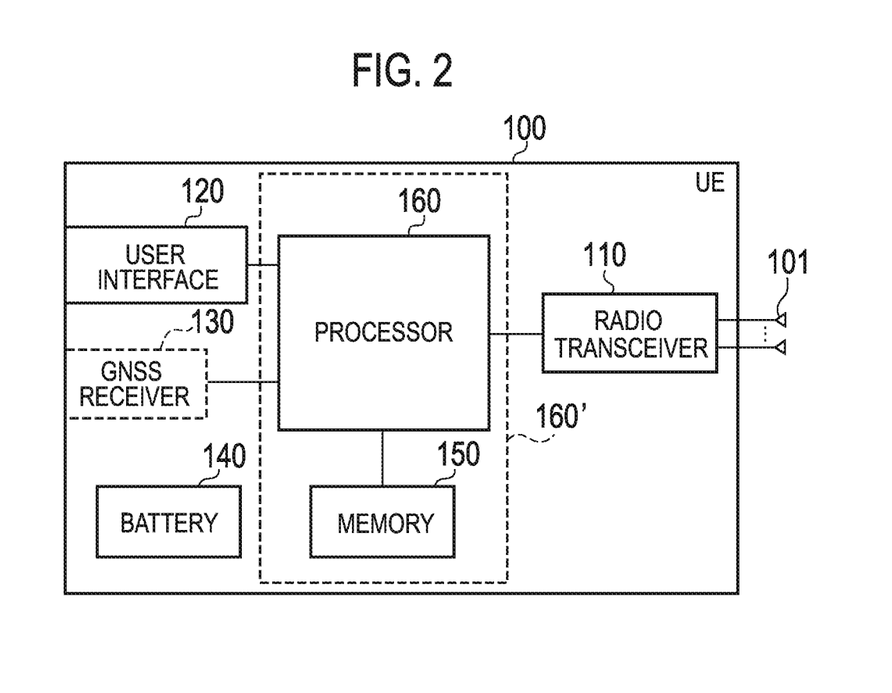
FIG. 2 is a block diagram of a UE according to the embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 corresponds to storage, and the processor 160 corresponds to a controller. The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (transmission signal) output from the processor 160 into the radio signal, and transmits the radio signal from the antennas 101. Furthermore, the radio transceiver 110 converts the radio signal received by the antennas 101 into the baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
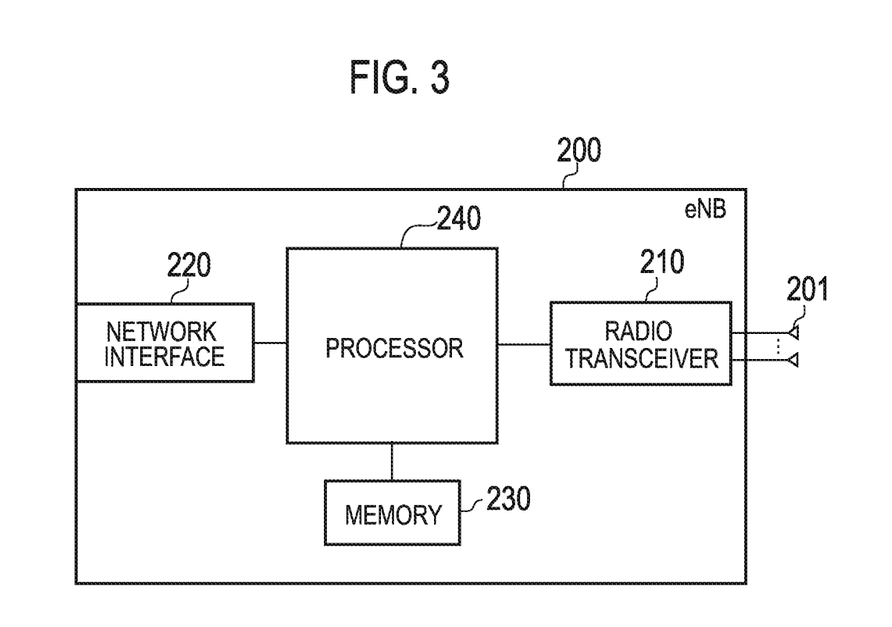
FIG. 3 is a block diagram of an eNB according to the embodiment.

FIG. 3 is a block diagram of the eNB 200. As illustrated in FIG. 3, the eNB 200 includes a plurality of antennas 201, a radio transceiver 210, a network interface 220, a memory 230, and a processor 240.

The antennas 201 and the radio transceiver 210 are used to transmit and receive a radio signal. The radio transceiver 210 converts the baseband signal (transmission signal) output from the processor 240 into the radio signal, and transmits the radio signal from the antennas 201. Furthermore, the radio transceiver 210 converts the radio signal received by the antennas 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 implements various processes and various communication protocols described later. It is noted that the memory 230 may be integrally formed with the processor 240, and this set (that is, a chipset) may be called a processor.

Figure 4:
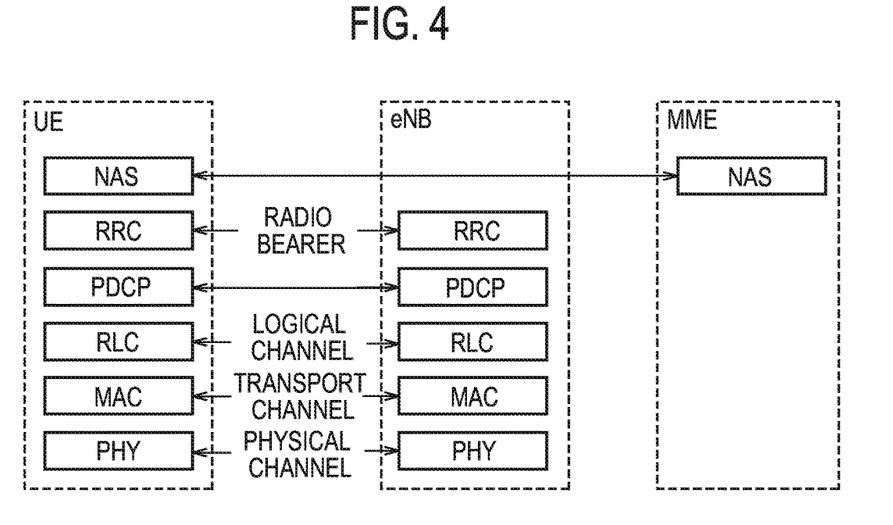
FIG. 4 is a protocol stack diagram according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs preferential control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a scheduler for determining (scheduling) a transport format (a transport block size, a modulation and coding scheme) of an uplink and a downlink, and an assignment resource block to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is a connection (an RRC connection) between the RRC of the UE 100 and the RRC of the eNB 200, the UE 100 is in a RRC connected state and otherwise, the UE 100 is in an RRC idle state.

A NAS (Non-Access Stratum) layer positioned above the RRC layer performs session management or mobility management, for example.

Figure 5:
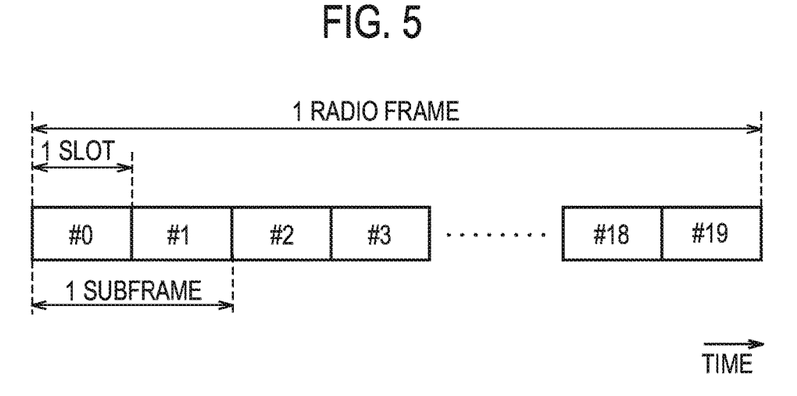
FIG. 5 is a configuration diagram of a radio frame according to the embodiment.

FIG. 5 is a configuration diagram of a radio frame used in the LTE system. In the LTE system, OFDMA (Orthogonal Frequency Division Multiplex Access) is applied to a downlink (DL), and SC-FDMA (Single Carrier Frequency Division Multiple Access) is applied to an uplink (UL), respectively.

As illustrated in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol. Among radio resources allocated to the UE 100, a frequency resource can be configured by a resource block and a time resource can be configured by a subframe (or slot).

(D2D Proximity Service)

A D2D proximity service will be described, below. An LTE system according to an embodiment supports the D2D proximity service. The D2D proximity service is described in the Non-Patent Document 1, and an outline thereof will be described here.

The D2D proximity service (D2D ProSe) is a service enabling direct UE-to-UE communication within a synchronization cluster including a plurality of synchronized UEs 100. The D2D proximity service includes a D2D discovery procedure (Discovery) in which a proximal UE is discovered and D2D communication (Communication) that is direct UE-to-UE communication. The D2D communication is also called Direct communication.

A scenario in which all the UEs 100 forming the synchronization cluster are located in a cell coverage is called "In coverage". A scenario in which all the UEs 100 forming the synchronization cluster are located out of a cell coverage is called "Out of coverage". A scenario in which some UEs 100 in the synchronization cluster are located in a cell coverage and the remaining UEs 100 are located out of the cell coverage is called "Partial coverage".

In "In coverage", the eNB 200 is a D2D synchronization source, for example. A D2D asynchronization source is synchronized with the D2D synchronization source without transmitting a D2D synchronization signal. The eNB 200 that is a D2D synchronization source transmits, by a broadcast signal, D2D resource information indicating a radio resource available for the D2D proximity service. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200.

In "Out of coverage" or "Partial coverage", the UE 100 is a D2D synchronization source, for example. In "Out of coverage", the UE 100 that is a D2D synchronization source transmits D2D resource information indicating a radio resource available for the D2D proximity service, by a D2D synchronization signal, for example. The D2D synchronization signal is a signal transmitted in a D2D synchronization procedure in which device-to-device synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information is conveyed than the D2DSS. The PD2DSCH conveys the above-described D2D resource information (Discovery resource information, Communication resource information). Alternatively, when the D2DSS is associated with the D2D resource information, the PD2DSCH may be rendered unnecessary.

The D2D discovery procedure is used mainly when the D2D communication is performed by unicast. One UE 100 uses any particular radio resource out of radio resources available for the D2D discovery procedure when starting the D2D communication with another UE 100 to transmit a Discovery signal. The other UE 100 scans the Discovery signal within the radio resource available for the D2D discovery procedure when starting the D2D communication with the one UE 100 to receive the Discovery signal. The Discovery signal may include information indicating a radio resource used by the one UE 100 for the D2D communication.

(Operation According to Embodiment)

Figure 6:
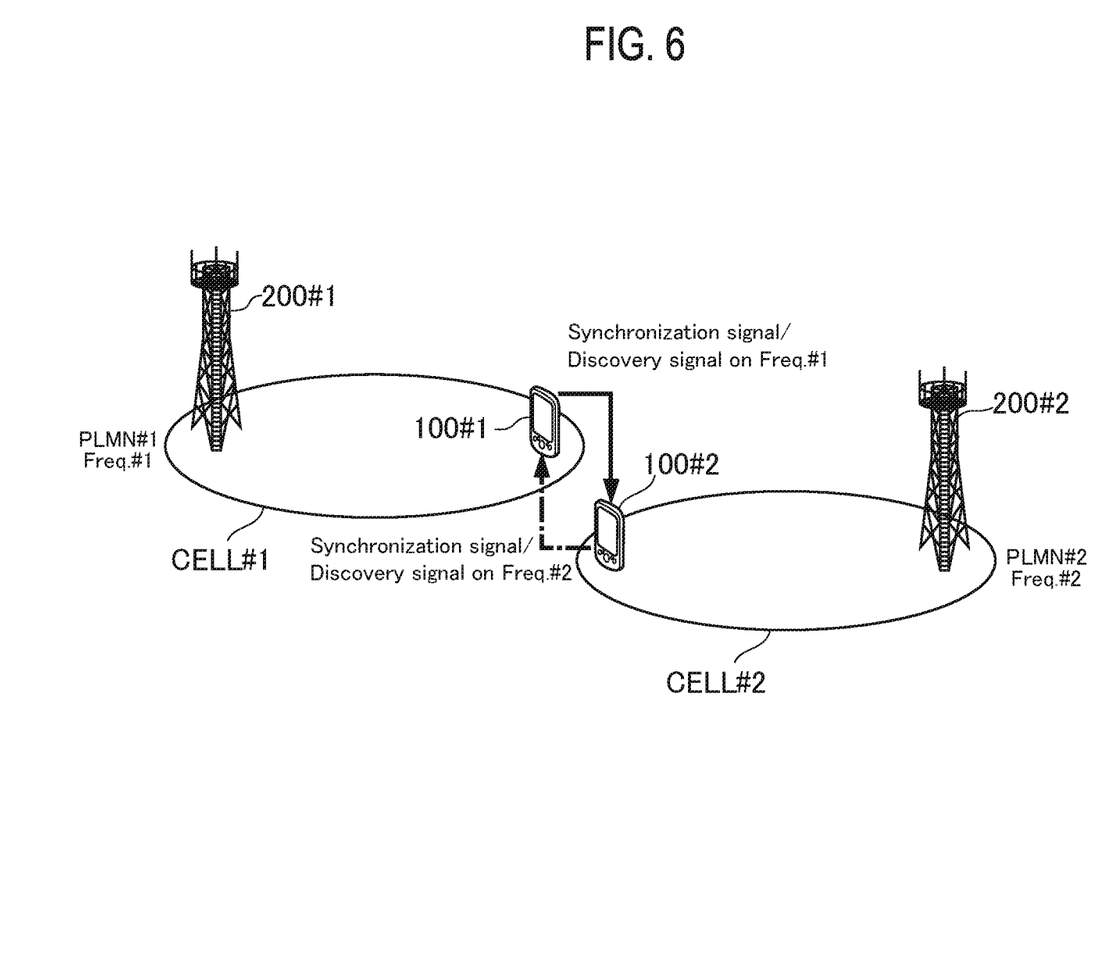
FIG. 6 is a diagram illustrating an operation environment according to the embodiment.

An operation according to the embodiment will be described, below. FIG. 6 is a diagram showing an operation environment according to the embodiment.

As shown in FIG. 6, an eNB 200 #1 is comprised in a PLMN #1 that is an LTE network of a network operator #1. The PLMN #1 is allocated a frequency band #1 (Freq. #1). The eNB 200 #1 manages a cell #1 of the frequency band #1.

A UE 100 #1 exists in the cell #1, and resisters its location in the PLMN #1. In other words, the UE 100 #1 belongs to the PLMN #1. For example, the UE 100 #1 is in an RRC idle state in the cell #1. Alternatively, the UE 100 #1 may be in a RRC connected state in the cell #1.

An eNB 200 #2 is comprised in a PLMN #2 that is an LTE network of a network operator #2. The PLMN #2 is allocated a frequency band #2 (Freq. #2). The eNB 200 #2 manages a cell #2 of the frequency band #2. The cell #2 is located in the proximity of the cell #1. The eNB 200 #2 is synchronized with the eNB 200 #1. Alternatively, the eNB 200 #2 may also be asynchronized with the eNB 200 #1.

The UE 100 #2 exists in the cell #2, and resisters its location in the PLMN #2. That is, the UE 100 #2 belongs to the PLMN #2. The UE 100 #2 is in an RRC idle state in the cell #2. Alternatively, the UE 100 #2 may be in a RRC connected state in the cell #2.

In such an operation environment, a case is assumed where the D2D proximity service described above is applied to the UE 100 #1 and the UE 100 #2.

In such a case, the UE 100 #1 receives the D2D resource information (the Discovery resource information, the Communication resource information) from the eNB 200 #1. Each of the Discovery resource information and the Communication resource information transmitted by the eNB 200 #1 indicates a radio resource included in the frequency band #1.

The UE 100 #2 receives the D2D resource information (the Discovery resource information, the Communication resource information) from the eNB 200 #2. Each of the Discovery resource information and the Communication resource information transmitted by the eNB 200 #2 indicates a radio resource included in the frequency band #2.

Thus, the frequency band #1 used by the UE 100 #1 for the D2D discovery procedure/D2D communication does not match the frequency band #2 used by the UE 100 #2 for the D2D discovery procedure/D2D communication, and thus, it is not possible to start the D2D communication by the UE 100 #1 and the UE 100 #2 belonging to different PLMNs.

Figure 7:
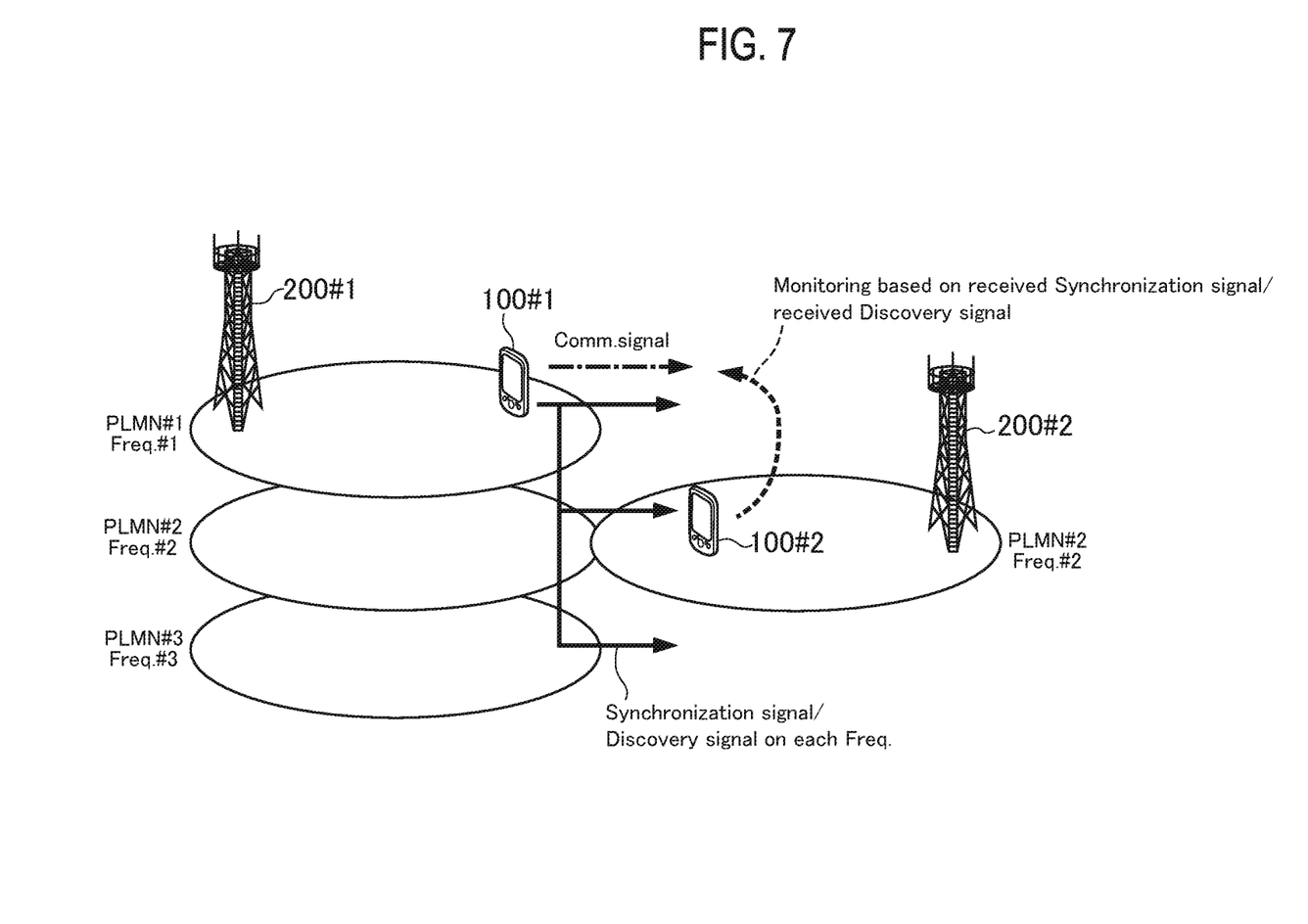
FIG. 7 is a diagram showing an operation according to the embodiment.

Therefore, in the embodiments, with a method described below, it is possible to start the D2D communication by the UE 100 #1 and the UE 100 #2. FIG. 7 is a diagram showing an operation according to the embodiment.

As shown in FIG. 7, the UE 100 #1 performing the D2D communication in the frequency band #1 (predetermined frequency band) transmits a specific D2D signal. For example, the UE 100 #1 delivers advertisement data by the D2D communication. It is noted that the UE 100 #1 may be installed securely for an advertisement delivery.

The specific D2D signal is the Discovery signal or the D2D synchronization signal. When the eNB 200 #1 and the eNB 200 #2 are synchronized (that is, when the UE 100 #1 and the UE 100 #2 are synchronized), the specific D2D signal may be the Discovery signal. When the eNB 200 #1 and the eNB 200 #2 are asynchronous, (that is, when the UE 100 #1 and the UE 100 #2 are asynchronous), the specific D2D signal may be the D2D synchronization signal.

The UE 100 #1 not only transmits the specific D2D signal in the frequency band #1, but also transmits the specific D2D signal in the frequency bands #2 and #3. The frequency band #1 is a frequency band allocated to the PLMN #1. The frequency band #2 is a frequency band allocated to the PLMN #2. The frequency band #3 is a frequency band allocated to the PLMN #3.

It is noted that the UE 100 #1 stores beforehand information indicating the frequency bands #1 to #3 in which the specific D2D signal should be transmitted. Alternatively, the UE 100 #1 may acquire, from the eNB 200 #1, information indicating the frequency bands #1 to #3 in which the specific D2D signal should be transmitted.

Further, the UE 100 #1 stores beforehand information indicating a radio resource available for transmitting the specific D2D signal, for each of the frequency bands #1 to #3. Alternatively, the UE 100 #1 may acquire, from the eNB 200 #1, the information indicating the radio resource available for transmitting the specific D2D signal, for each of the frequency bands #1 to #3.

Thus, the UE 100 #1 transmits the specific D2D signal in each of the frequency bands (frequency bands #1 to #3). The specific D2D signal includes frequency band information indicating the frequency band #1 used by the UE 100 #1 for the D2D communication. The frequency band information includes information indicating a center frequency of the frequency band #1 and information indicating a bandwidth of the frequency band #1. Further, the specific D2D signal includes setting information indicating various settings applied to the D2D communication. The setting information will be described in detail later.

Meanwhile, the UE 100 #2 scans the specific D2D signal only in the frequency band #2. As a result, the UE 100 #2 receives the specific D2D signal transmitted from the UE 100 #1 in the frequency band #2.

Then, the UE 100 #2 performs control to start the D2D communication with the UE 100 #1 on the basis of the received specific D2D signal. Specifically, on the basis of the frequency band information included in the specific D2D signal, the UE 100 #2 recognizes the frequency band #1 used by the UE 100 #1 that transmits the specific D2D signal for the D2D communication. Then, on the basis of the setting information included in the specific D2D signal, the control to start the D2D communication in the frequency band #1 is performed.

Here, when the specific D2D signal is a Discovery signal, the UE 100 #2 starts the D2D communication with the UE 100 #1 in the frequency band #1 on the basis of the Discovery signal. Alternatively, when the specific D2D signal is a D2D synchronization signal, the UE 100 #2 may perform the D2D discovery procedure in the frequency band

1 on the basis of the D2D synchronization signal and then start the D2D communication with the UE 100 #1.

Therefore, according to the embodiment, it is possible to configure that the D2D communication is started by the UE 100 #1 and the UE 100 #2 belonging to different PLMNs.

(Setting Information to be Included in Specific D2D Signal)

The setting information included in a specific D2D signal will be described, below.

The setting information may include frequency information related to a frequency resource available/used for the D2D communication in the frequency band #1. The frequency information is at least one of: a resource block number and a resource block range.

The setting information may include time information related to a time resource (a radio resource, a subframe) to be available/used for the D2D communication in the frequency band #1. The time information is at least one of: a system frame number, a subframe number, a start/terminate subframe, and a transmission period.

The setting information may include a PLMN identifier of the PLMN #1. In this case, on the basis of the PLMN identifier, the UE 100 #2 is capable of inquiring the PLMN #1, through the eNB 200 #2, as to the UE 100 #1 that has transmitted the specific D2D signal.

The setting information may include information indicating a Modulation and Coding Scheme (MCS) applied to the D2D communication signal. The information is necessary when the MCS applied to the D2D communication signal is variable.

The setting information may include information indicating an encryption setting (encryption key, integrity algorithm) applied to the D2D communication signal. The information is necessary when the D2D communication signal is encrypted.

The setting information may include an identifier of a message format applied to the D2D communication signal. The information is necessary for interpreting the D2D communication signal when a variable CP length, a variable message/control bit number, and the like are applied to the D2D communication.

[Other Embodiments]

The above-described embodiment does not particularly describe a case where the frequency resource available/used for the D2D communication changes (hops) in time. However, the frequency resource available/used for the D2D communication may change (hop) in time. In this case, the above-described frequency information and time information may be configured to show a pattern of such hopping (hopping pattern).

In the above-described embodiment, one example is described where the UE 100 #1 and the UE 100 #2 belong to the different PLMNs. However, the UE 100 #1 and the UE 100 #2 may belong to the same PLMN assuming that different frequency bands are used for the D2D proximity service. When the UE 100 #1 and UE 100 #2 belong to the same PLMN, it may be possible to simplify the above-described setting information.

In the above-described embodiment, an example is described where the D2D proximity service is used in a coverage across the different PLMNs; however, it is possible to also apply the present invention to a case where at least one of the UE 100 #1 and UE 100 #2 is out of range (partial coverage, out-of-coverage).

Further, in the above-described embodiment, in each of the frequency bands (frequency bands #1 to #3), the UE 100 #1 transmits the specific D2D signal including the frequency band information indicating the frequency band #1. However, the UE 100 #1 may not include the frequency band information indicating the frequency band #1, into the specific D2D signal transmitted in the frequency band #1.

In the described-above embodiment, although an LTE system is described as an example of a mobile communication system, it is not limited to the LTE system, and the present invention may be applied to a system other than the LTE system.

It is noted that the entire content of Japanese Patent Application No. 2014-028808 (filed on Feb. 18, 2014) is incorporated herein by reference.

INDUSTRIAL APPLICABILITY

As described above, the user terminal and the communication control method according to the present embodiment are useful in the field of mobile communication because it is possible to start D2D communication between user terminals belonging to different PLMNs.

The invention claimed is:

1. A user terminal configured to perform direct communication between terminals by proximity service, comprising:
   a transmitter configured to directly transmit a specific signal to another user terminal in a first frequency, the specific signal is specific to the another user terminal, which is a terminal to perform the direct communication with the user terminal, and including frequency information indicating a second frequency to be used for a data transmission in the direct communication between the user terminal and the another user terminal, wherein
   the transmitter is configured to directly transmit data to the another user terminal by the direct communication in the second frequency different from the first frequency,
   the transmitter is configured to directly transmit the specific signal to the another user terminal in the first frequency of which the another user terminal exists in a first cell, and
   the transmitter is configured to directly transmit the data to the another user terminal by the direct communication in the second frequency of which the user terminal exists in a second cell.

2. The user terminal according to claim 1, wherein
   the transmitter is configured to directly transmit the specific signal in the first frequency allocated to a first Public Land Mobile Network (PLMN), and
   the transmitter is configured to directly transmit the data in the second frequency allocated to a second PLMN.

3. The user terminal according to claim 1, wherein the frequency information includes information indicating a center frequency of the second frequency, and information indicating a bandwidth of the second frequency.

4. The user terminal according to claim 1, wherein the specific signal further includes at least one of time information related to a time resource used for the direct communication and frequency information related to a frequency resource used for the direct communication.

5. A user terminal configured to perform direct communication between terminals by proximity service, comprising:
   a receiver configured to directly receive a specific signal from another user terminal in a first frequency, the specific signal is specific to the another user terminal, which is a terminal to perform the direct communication with the user terminal, and including frequency information indicating a second frequency to be used for a data transmission in the direct communication between the user terminal and the another user terminal, wherein the receiver is configured to directly receive data from the another user terminal by the direct communication in the second frequency different from the first frequency, the receiver is configured to directly receive the specific signal from the another user terminal in the first frequency of which the another user terminal exists in a first cell, and the receiver is configured to directly receive the data to the another user terminal by the direct communication in the second frequency of which the user terminal exists in a second cell.

6. The user terminal according to claim 5, wherein the receiver is configured to directly receive the specific signal in the first frequency allocated to a first Public Land Mobile Network (PLMN), and the receiver is configured to directly receive the data in the second frequency allocated to a second PLMN.

7. The user terminal according to claim 5, wherein the frequency information includes information indicating a center frequency of the second frequency band, and information indicating a bandwidth of the second frequency band.

8. The user terminal according to claim 5, wherein the specific signal further includes at least one of time information related to a time resource used for the direct communication, and frequency information related to a frequency resource used for the direct communication.

9. A communication control method comprising:

directly transmitting, by a first user terminal configured to perform direct communication between terminals by proximity service, a specific signal to a second user terminal in a first frequency, the specific signal is specific to the second user terminal, which is a terminal to perform the direct communication with the first user terminal, and including frequency information indicating a second frequency to be used for a data transmission in the direct communication between the first user terminal and the second user terminal;

directly receiving, by the second user terminal, the specific signal from the first user terminal in the first frequency;

directly transmitting, by the first user terminal, data to the second user terminal by the direct communication in the second frequency different from the first frequency; and directly receiving, by the second user terminal, data from the first user terminal by the direct communication in the second frequency, wherein directly transmitting the specific signal includes directly transmitting the specific signal to the second user terminal in the first frequency of which the second user terminal exists in a first cell, and directly transmitting the data includes directly transmitting the data to the second user terminal by the direct communication in the second frequency of which the first user terminal exists in a second cell.

10. The user terminal according to claim 1, wherein the transmitter is configured to directly transmit the specific signal and another specific signal, and the transmitter is configured to directly transmit the another specific signal in the second frequency, wherein the another specific signal includes the frequency information indicating the second frequency.

11. The user terminal according to claim 1, wherein the transmitter is configured to directly transmit the specific signal and another specific signal, and the transmitter is configured to directly transmit the another specific signal in the second frequency, wherein the another specific signal does not include the frequency information indicating the second frequency.

* * * * *